US008875581B2

(12) United States Patent
Nakamura et al.

(10) Patent No.: US 8,875,581 B2
(45) Date of Patent: Nov. 4, 2014

(54) ULTRASONIC WAVE CONTROL DEVICE AND RECORDING MATERIAL DETERMINING DEVICE

(75) Inventors: Tomoharu Nakamura, Mishima (JP); Norio Matsui, Mishima (JP); Shoichi Koyama, Susono (JP); Tsutomu Ishida, Mishima (JP); Shun-ichi Ebihara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 12/966,973

(22) Filed: Dec. 13, 2010

(65) Prior Publication Data

US 2011/0142461 A1 Jun. 16, 2011

Related U.S. Application Data

(63) Continuation of application No. PCT/JP2009/070857, filed on Dec. 14, 2009.

(51) Int. Cl.
*G01N 29/04* (2006.01)
*G03G 15/00* (2006.01)

(52) U.S. Cl.
CPC .................................. *G03G 15/5029* (2013.01)
USPC ............................................... 73/599; 73/632

(58) Field of Classification Search
USPC .......................... 73/599, 290 V; 399/45, 319
See application file for complete search history.

(56) References Cited

U.S. PATENT DOCUMENTS

| | | | | |
|---|---|---|---|---|
| 4,114,441 | A * | 9/1978 | Magri | 73/290 V |
| 4,198,154 | A * | 4/1980 | Masegi et al. | 347/131 |
| 4,233,720 | A * | 11/1980 | Rozmus | 419/49 |
| 4,506,275 | A * | 3/1985 | Maeda | 347/251 |
| 4,941,021 | A * | 7/1990 | Uchida et al. | 399/322 |
| 5,724,138 | A * | 3/1998 | Reich et al. | 356/492 |
| 6,213,958 | B1 * | 4/2001 | Winder | 600/586 |
| 6,261,249 | B1 * | 7/2001 | Talish et al. | 601/2 |
| 6,892,038 | B2 * | 5/2005 | Fukutani | 399/68 |
| 7,130,245 | B2 | 10/2006 | Okitsu et al. | |
| 7,848,669 | B2 * | 12/2010 | Torimaru | 399/45 |

FOREIGN PATENT DOCUMENTS

| | | | |
|---|---|---|---|
| CN | 86105300 | A | 2/1988 |
| EP | 1443007 | A2 | 8/2004 |
| JP | 2004-219856 | A | 8/2004 |
| JP | 2004-231404 | A | 8/2004 |
| JP | 2006-264927 | A | 10/2006 |
| JP | 2007-022793 | A | 2/2007 |
| JP | 2009-161291 | A | 7/2009 |
| JP | 2009-173359 | A | 8/2009 |

* cited by examiner

*Primary Examiner* — J M Saint Surin
(74) *Attorney, Agent, or Firm* — Canon USA, Inc. IP Division

(57) ABSTRACT

In a device for detecting a basis weight of a recording material, an initial measurement is performed by using ultrasonic waves that have passed through the recording material, and the recording material is roughly classified first. By changing the number of pulses of the driving signal in accordance with a result of the initial measurement, the basis weight of the recording material can be detected by using ultrasonic waves suitable for the recording material, so that the detection accuracy of the basis weight of the recording material can be increased.

27 Claims, 13 Drawing Sheets

ULTRASONIC WAVE CONTROL DEVICE AND RECORDING MATERIAL DETERMINING DEVICE

This application is a Continuation of International Application No. PCT/JP2009/070857, filed Dec. 14, 2009, which is hereby incorporated by reference herein in its entirety.

TECHNICAL FIELD

The present invention is an invention related to an ultrasonic wave control device that controls drive of ultrasonic waves and to a recording material determining device provided with the ultrasonic wave control device.

BACKGROUND ART

In a conventional image forming apparatus, the type of recording material (hereinafter also referred to as the type of paper) is set by a user with a setting using a computer or the like serving as an external apparatus or an operation panel provided in a main body of the image forming apparatus. In order to reduce burdens of such a user setting made from a computer or operation panel, an image forming apparatus that includes a sensor or the like serving as a determining device for determining the type of paper and that has a function of automatically determining the type of paper has been provided in recent years.

For example, PTL 1 suggests a method for applying ultrasonic waves to a recording material and detecting ultrasonic waves that are reflected from or pass through the recording material, thereby determining the surface properties and thickness of the recording material. Also, PTL 2 suggests a method for applying ultrasonic waves in an image forming apparatus in a state where no recording material is placed in order to adjust an initial value of ultrasonic waves, and controlling an output value of driving signals for driving ultrasonic waves that are transmitted to determine the type of paper of a recording material on the basis of a received voltage value of ultrasonic waves received by an ultrasonic sensor on a receiver side.

However, since driving signals are controlled with no recording material being placed, the driving signals controlled with no recording material being placed are not necessarily optimized for detecting a basis weight in a case where basis weights of various recording materials, such as thin paper having a small basis weight to thick paper having a large basis weight, are to be detected. For example, assume that a driving signal that is adjusted with no recording material being placed is suitable for detecting a basis weight of ordinary paper, then a small output value is obtained in a recording material that is so-called thick paper having a basis weight of 120 g/m$^2$ or more, which causes the possibility of determination of the type of paper being difficult. Also, a large output value is obtained in a recording material that is so-called thin paper having a basis weight of 75 g/m$^2$ or less and the output value is saturated, which causes the possibility of determination of the type of paper being difficult.

The invention according to the present invention has been made in view of the above-described circumstances, and an object thereof is to appropriately control driving signals in accordance with a recording material and to output ultrasonic waves in accordance with the recording material.

CITATION LIST

Patent Literature

PTL 1: Japanese Patent Laid-Open No. 2004-219856
PTL 2: Japanese Patent Laid-Open No. 2004-231404

SUMMARY OF INVENTION

In order to achieve the above-described object, there are provided ultrasonic wave transmitting means for transmitting an ultrasonic wave, ultrasonic wave receiving means for receiving an ultrasonic wave, driving signal transmitting means for transmitting a driving signal that has a predetermined number of pulses in order to cause the ultrasonic wave transmitting means to transmit an ultrasonic wave, and control means for controlling transmission and reception of an ultrasonic wave. The control means performs control to change the number of pulses of the driving signal in accordance with an ultrasonic wave that is transmitted from the ultrasonic wave transmitting means, that attenuates when passing through a recording material, and that is received by the ultrasonic wave receiving means, and to cause an ultrasonic wave to be transmitted on the basis of the driving signal in which the number of pulses has been changed.

Further features of the present invention will become apparent from the following description of exemplary embodiments with reference to the attached drawings.

DESCRIPTION OF EMBODIMENTS

Hereinafter, embodiments of the present invention will be described using the drawings. Note that the following embodiments do not limit the invention according to the claims and that not all combinations of features described in the embodiments are essential to the solving means of the invention.

(First Embodiment)

Figure 1:
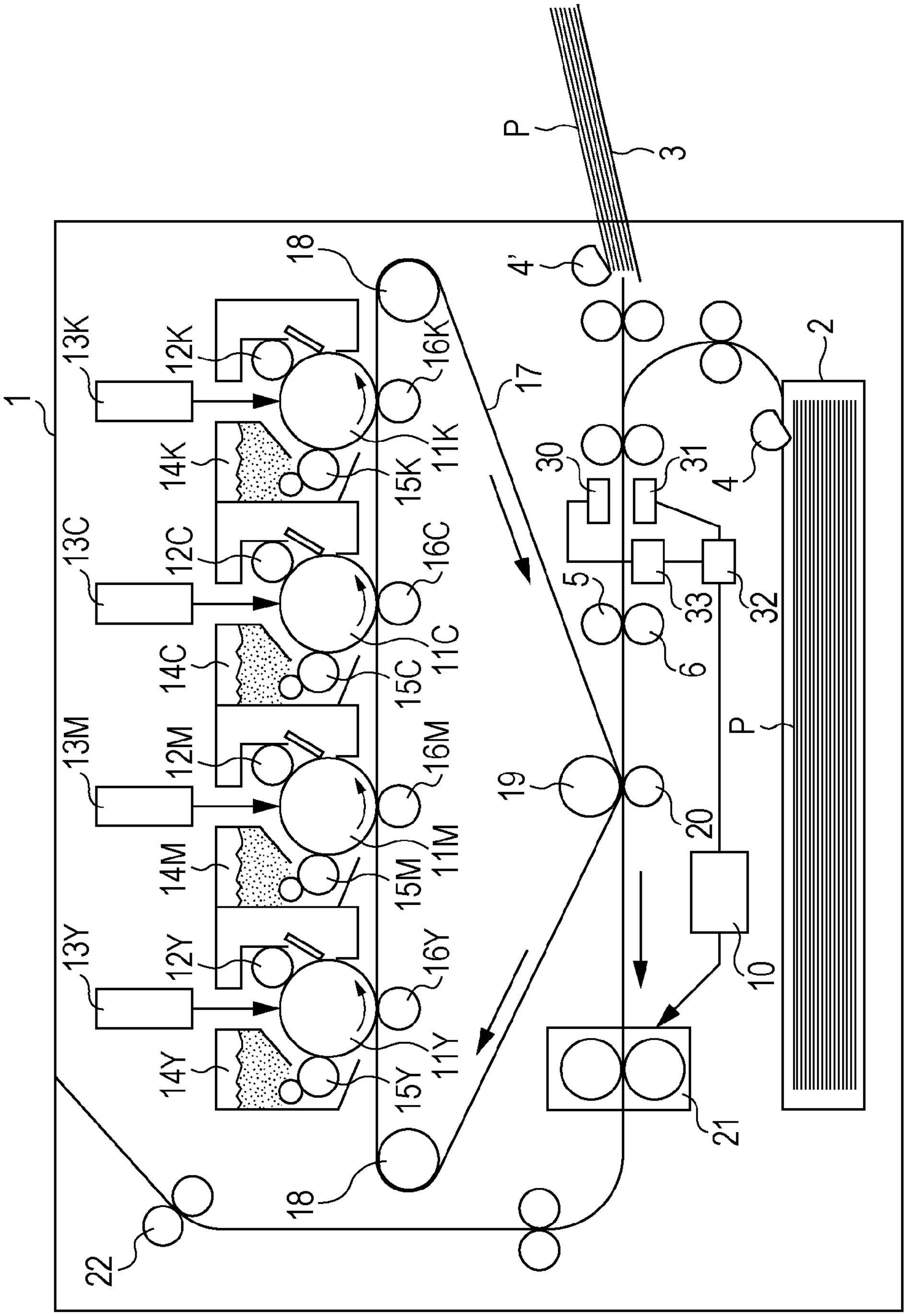
FIG. 1 is a schematic view illustrating a configuration of an image forming apparatus.

An ultrasonic wave control device and a recording material determining device according to this embodiment can be used in an image forming apparatus, such as a copying machine or a printer, for example. FIG. 1 is a configuration diagram illustrating an image forming apparatus as an example that adopts an intermediate transfer belt and that includes a plurality of image forming units arranged in parallel.

The configuration of the image forming apparatus 1 in FIG. 1 is as follows. Reference numeral 2 denotes a paper feed cassette that accommodates a recording material P. Reference numeral 3 denotes a paper feed tray on which a recording material P is loaded. Reference numeral 4 denotes a paper feed roller that feeds a recording material P from the paper feed cassette 2. Reference numeral 4' denotes a paper feed roller that feeds a recording material P from the paper feed tray 3. Reference numeral 5 denotes a conveying roller that conveys a recording material P fed thereto, and reference numeral 6 denotes an opposed conveying roller that is opposed to the conveying roller 5. Reference numerals 11Y, 11M, 11C, and 11K denote photoconductor drums that carry developers of respective colors of yellow, magenta, cyan, and black. Reference numerals 12Y, 12M, 12C, and 12K denote charging rollers serving as primary charging means for the respective colors for causing the photoconductor drums 11Y, 11M, 11C, and 11K to be uniformly charged at a predetermined potential. Reference numerals 13Y, 13M, 13C, and 13K denote optical units that irradiate the photoconductor drums 11Y, 11M, 11C, and 11K that are charged by the primary charging means with laser light corresponding to image data pieces of the respective colors, so as to form electrostatic latent images.

Reference numerals 14Y, 14M, 14C, and 14K denote developing machines for visualizing electrostatic latent images formed on the photoconductor drums 11Y, 11M, 11C, and 11K. Reference numerals 15Y, 15M, 15C, and 15K denote developer conveying rollers for conveying developers in the developing machines 14Y, 14M, 14C, and 14K to portions opposed to the photoconductor drums 11Y, 11M, 11C, and 11K. Reference numerals 16Y, 16M, 16C, and 16K denote primary transfer rollers for the respective colors for primarily transferring images formed on the photoconductor drums 11Y, 11M, 11C, and 11K. Reference numeral 17 denotes an intermediate transfer belt that carries a primarily-transferred image. Reference numeral 18 denotes a driving roller that drives the intermediate transfer belt 17. Reference numeral 19 denotes a secondary transfer roller for transferring an image formed on the intermediate transfer belt 17 onto a recording material P, and reference numeral 20 denotes an opposed secondary transfer roller that is opposed to the secondary transfer roller 19. Reference numeral 21 denotes a fixing unit that fuses and fixes a developer image transferred onto a recording material P while conveying the recording material P. Reference numeral 22 denotes an output roller that outputs a recording material P on which fixing has been performed by the fixing unit 21.

The photoconductor drums 11Y, 11M, 11C, and 11K, the charging rollers 12Y, 12M, 12C, and 12K, the developing machines 14Y, 14M, 14C, and 14K, and the developer conveying rollers 15Y, 15M, 15C, and 15K are integrated in units of colors. Such an integrated unit of a photoconductor drum, a charging roller, and a developing machine is called a cartridge, and the cartridges of the respective colors are configured so as to be easily detachable from/attachable to the main body of the image forming apparatus.

Next, an image formation operation of the image forming apparatus 1 will be described. Print data including a print command, image information, etc., is input to the image forming apparatus 1 from a host computer or the like (not illustrated). Then, the image forming apparatus 1 stars a printing operation, and a recording material P is fed from the paper feed cassette 2 or the paper feed tray 3 by the paper feed roller 4 or the paper feed roller 4' and is sent to a conveyance path. The recording material P is suspended at the conveying roller 5 and the opposed conveying roller 6 and waits until image formation is performed so as to achieve synchronization of a formation operation of an image formed on the intermediate transfer belt 17 and timing of conveyance. Together with an operation of feeding the recording material P, an image formation operation is performed in which the photoconductor drums 11Y, 11M, 11C, and 11K are caused to be charged at a certain potential by the charging rollers 12Y, 12M, 12C, and 12K. The optical units 13Y, 13M, 13C, and 13K cause the surfaces of the charged photoconductor drums 11Y, 11M, 11C, and 11K to be exposed to laser beams for scanning to form electrostatic latent images in accordance with the input print data. In order to visualize the formed electrostatic latent images, the developing machines 14Y, 14M, 14C, and 14K and the developer conveying rollers 15Y, 15M, 15C, and 15K perform development. The electrostatic latent images formed on the surfaces of the photoconductor drums 11Y, 11M, 11C, and 11K are developed as images with the respective colors by the developing machines 14Y, 14M, 14C, and 14K. The photoconductor drums 11Y, 11M, 11C, and 11K are in contact with the intermediate transfer belt 17 and rotate in synchronization with rotation of the intermediate transfer belt 17. The individual developed images are sequentially transferred onto the intermediate transfer belt 17 by the primary transfer rollers 16Y, 16M, 16C, and 16K while being overlapped. Then, the images are secondarily transferred onto the recording material P by the secondary transfer roller 19 and the opposed secondary transfer roller 20.

After that, the recording material P is conveyed to a secondary transfer unit so that secondary transfer onto the recording material P is performed in synchronization with an image formation operation. The image formed on the intermediate transfer belt 17 is transferred onto the recording material P by the secondary transfer roller 19 and the opposed secondary transfer roller 20. The developer image transferred onto the recording material P is fixed by the fixing unit 21 including a fixing roller or the like. The fixed recording material P is output to an output tray (not illustrated) by the output roller 22, and the image formation operation ends.

Reference numeral 30 denotes an ultrasonic wave transmitting unit that transmits ultrasonic waves. In this embodiment, the ultrasonic wave transmitting unit 30 transmits ultrasonic waves having a frequency of 40 kHz, but the frequency of the ultrasonic waves is not limited thereto. Reference numeral 31 denotes an ultrasonic wave receiving unit, which receives ultrasonic waves transmitted from the ultrasonic wave transmitting unit 30. Reference numeral 32 denotes a received voltage detecting unit that detects an ultrasonic wave received by the ultrasonic wave receiving unit 31 as a voltage. Reference numeral 33 denotes an ultrasonic wave driving unit that transmits driving signals for transmitting ultrasonic waves. The driving signals will be described in detail below. Those individual units and a control unit 10 constitute an ultrasonic wave control device. The device also functions as a recording material determining device if the control unit 10 makes a determination of a recording material P on the basis of received ultrasonic waves. A result of a determination made on the recording material P by the control unit 10 can be used to control image formation conditions, such as a fixing conveyance speed, a fixing warm tone temperature, motor drive control, etc. Hereinafter, a description will be given about the ultrasonic wave control device as an example, but the ultrasonic wave control device can be replaced by a recording material determining device. Also, a detailed description about a method for detecting a basis weight of a recording material P is omitted here because a known method as described in Japanese Patent Laid-Open No. 2009-29622 can be used, for example.

Figure 2:
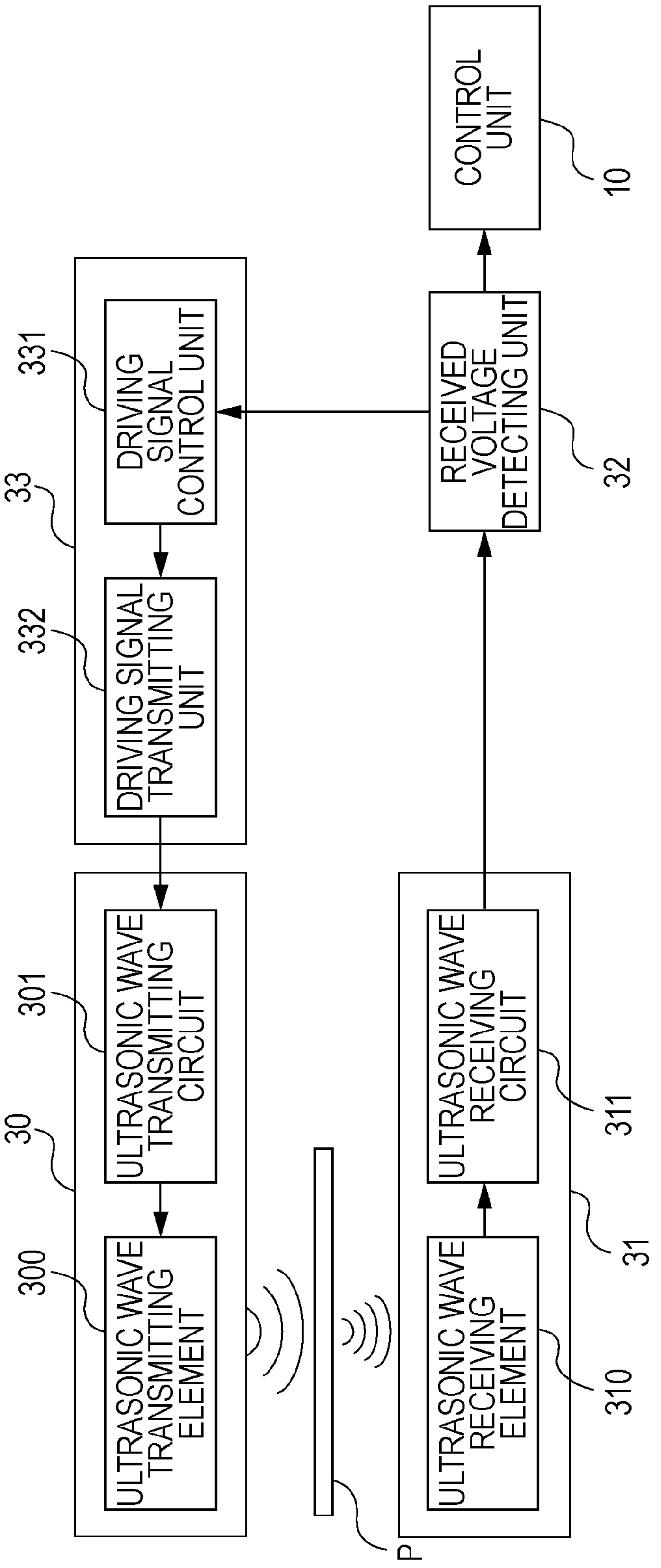
FIG. 2 is a block diagram illustrating a control system of an ultrasonic wave control device.

FIG. 2 is an example of a block diagram illustrating a control system that controls operation of the ultrasonic wave control device. First, the ultrasonic wave transmitting unit 30 in an initial operation state receives a driving signal on which an initial setting has been performed from a driving signal transmitting unit 332 of the ultrasonic wave driving unit 33. The driving signal is a driving signal that has a first period in which pulses are transmitted and a second period in which no pulse is transmitted. The ultrasonic wave transmitting unit 30 that has received, in an ultrasonic wave transmitting circuit 301, the driving signal transmits an ultrasonic wave from an ultrasonic wave transmitting element 300 toward a recording material P on the basis of the driving signal. The ultrasonic wave receiving unit 31 receives, in an ultrasonic wave receiving element 310, the ultrasonic wave that has passed through the recording material P, and amplifies the received ultrasonic wave in an ultrasonic wave receiving circuit 311. On the basis of a reception result output from the ultrasonic wave receiving circuit 311, the received voltage detecting unit 32 transmits an output value, which is generated by converting the reception result into a voltage, to a driving signal control unit 331 in the ultrasonic wave driving unit 33. In this embodiment, the ultrasonic wave transmitting element 300 is on the upper side and the ultrasonic wave receiving element 310 is on the lower side with respect to the recording material P. Alternatively, the ultrasonic wave transmitting element 300 may be on the lower side and the ultrasonic wave receiving element 310 may be on the upper side. Also, the ultrasonic wave transmitting element 300 and the ultrasonic wave receiving element 310 may be arranged so that an ultrasonic wave transmitted from the ultrasonic wave transmitting element 300 can pass through the recording material P and so that the passed ultrasonic wave can be received by the ultrasonic wave receiving element 310.

The driving signal control unit 331 performs control on the basis of the output value transmitted from the received voltage detecting unit 32 so that the number of pulses to be transmitted in the first period in the driving signal on which the initial setting has been performed is a value appropriate for the output value. The control of the number of pulses in the first period causes the second period in which no pulse is transmitted to change in accordance with the number of pulses. A specific method for controlling the number of pulses will be described below. The driving signal transmitting unit 332 generates again a driving signal on the basis of the number of pulses that has been appropriately set by the driving signal control unit 331. Then, on the basis of the driving signal generated again, the ultrasonic wave transmitting unit 30 transmits an ultrasonic wave, and the ultrasonic wave receiving unit 31 receives the ultrasonic wave that has passed through the recording material P. Then, an output value converted by the received voltage detecting unit 32 is transmitted to the control unit 10. On the basis of the transmitted output value, the control unit 10 determines the type of the recording material P. In addition, the control unit 10 is capable of applying feedback to the fixing unit or the like on the basis of the transmitted output value by using the output value itself without determining the type of the recording material P.

Figure 3:
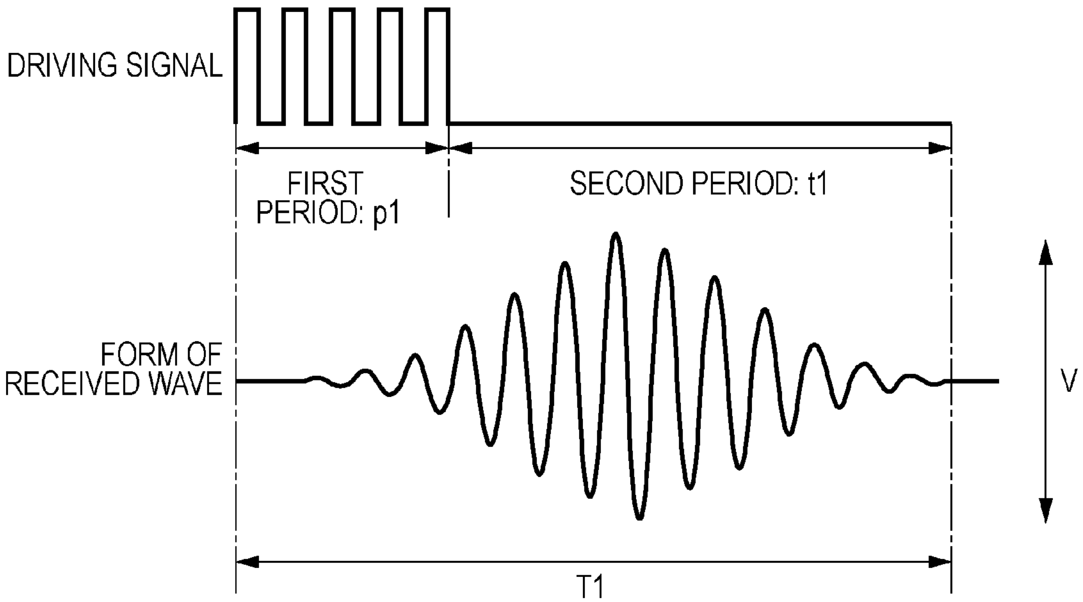
FIG. 3 is a diagram illustrating a relationship between a driving signal and an ultrasonic wave.

Next, a relationship between a driving signal and an ultrasonic wave according to this embodiment will be described with reference to FIG. 3. A driving signal for driving an ultrasonic wave is defined as a signal that has a first period in which a predetermined number of rectangular pulses are sequentially output and a second period in which output of pulses is suspended. A rectangular wave is used for a driving signal in the following description, but the driving signal is not limited to a rectangular wave. For example, a sine wave or a triangular wave can also be used. At that time, a pulse corresponds to one cycle of a wave, and a state where the first period in which a wave is transmitted and the second period in which no wave is transmitted are repeated is defined as a driving signal. That is, the driving signal may be a wave that has a first period and a second period for transmitting an ultrasonic wave.

By driving an ultrasonic wave using such a driving signal, the magnitude of vibration of the ultrasonic wave and an output period of the ultrasonic wave can be controlled. That is, as illustrated in FIG. 3, a time T1 from when transmission of an ultrasonic wave from the ultrasonic wave transmitting unit 30 starts until vibration of reception of the ultrasonic wave in the ultrasonic wave receiving unit 31 converges, and an amplitude V of the ultrasonic wave are determined depending on the number of pulses of the driving signal. Specifically, when the number of pulses of the driving signal increases, the amplitude V of the ultrasonic wave increases and the time T1 until vibration converges becomes long. When the number of pulses of the driving signal decreases, the amplitude V of the ultrasonic wave decreases and the time T1 until vibration converges becomes short. If an ultrasonic wave is transmitted again before the vibration in the ultrasonic wave receiving unit 31 converges, the value of reception of the ultrasonic wave varies, which is a factor in incorrect determination of a recording material.

Thus, the driving signal has a second period so that a next pulse is not output until vibration in the ultrasonic wave receiving unit 31 converges. This second period is determined by the time T1 until the ultrasonic wave converges. That is, the time until the ultrasonic wave converges is determined in accordance with the number of pulses in the first period. Here, the second period is defined as a time when the ultrasonic wave converges, but the first period may start at any time after the ultrasonic wave has converged, and the second period can be arbitrarily set to t1 or more.

By sequentially outputting driving signals that are capable of controlling the amplitudes of ultrasonic waves and convergence times in the above-described manner, a plurality of measurements can be performed on one recording material P. As the number of measurements is larger, more output values can be obtained, and thus the detection accuracy of the basis weight of the recording material P can be increased.

Figure 4B:
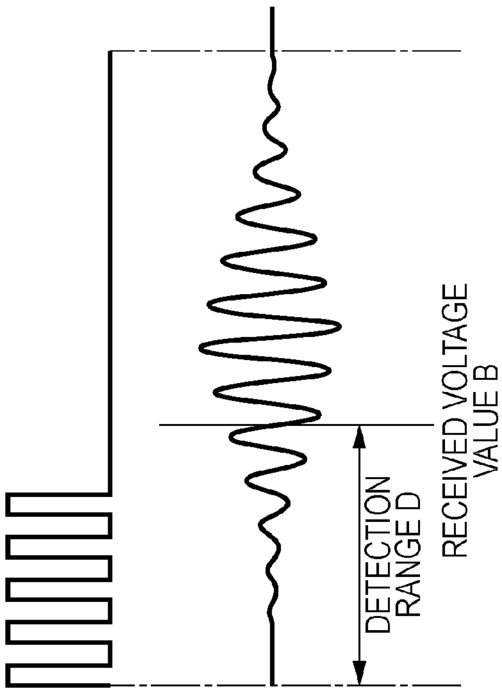
FIGS. 4A and 4B are diagrams illustrating forms of received waves in a case where the basis weights of recording materials P are 75 g/m$^2$ and 120 g/m$^2$, respectively.
Figure 4A:
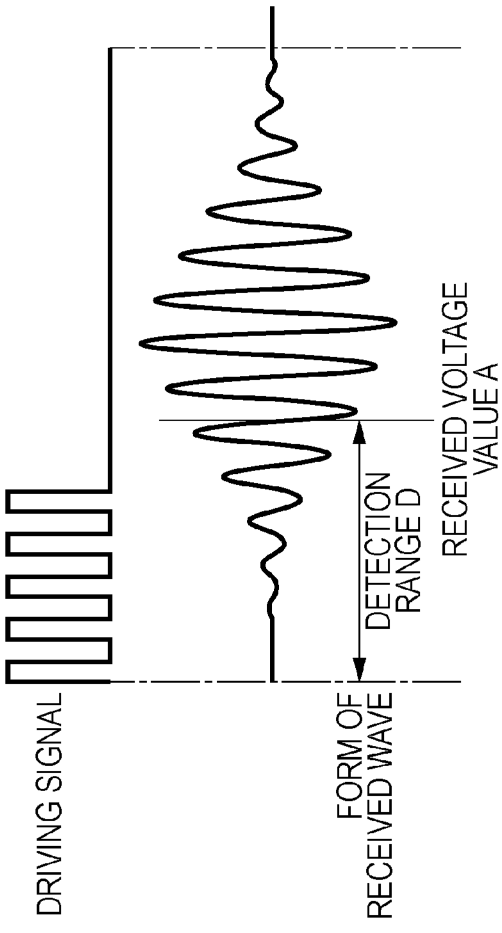

Next, a method for detecting the basis weight of a recording material P will be described with reference to FIGS. 4A and 4B. As illustrated in FIGS. 4A and 4B, an ultrasonic wave is driven by using a driving signal. As an example, FIG. 4A illustrates a case where the basis weight is 75 $g/m^2$, and FIG. 4B illustrates a case where the basis weight is 120 $g/m^2$, which illustrate the forms of received ultrasonic waves that have passed through the respective recording materials P. A detection range D is a range for obtaining Vp-p (peak-to-peak value) of a received voltage (hereinafter defined as a received voltage value) in the detection range D after a driving signal is transmitted to detect the basis weight of the recording material P. In this embodiment, the detection range D is defined as time, but is not limited to time. For example, the detection range D can be determined on the basis of the number of received waves or the like. In the detection range D, the value obtained by measuring the recording material P having a basis weight of 75 g/$m^2$ is a received voltage value A, and the value obtained by measuring the recording material P having a basis weight of 120 g/$m^2$ is a received voltage value B. The received voltage values have a relationship of A>B. A more specific relationship between a basis weight and a voltage value will be described with reference to FIG. 5. The reason why recording materials P having different basis weights have different received voltage values is that attenuation of ultrasonic waves that pass through a recording material P varies in accordance with a basis weight.

The detection range D is defined as a range that does not include a portion where the amplitude of the form of the received wave is the largest. The reason for this is to accurately detect the basis weight of the recording material P on the basis of an output value of an ultrasonic wave that has passed through the recording material P. That is, the amplitude of the form of a received wave becomes larger as the detection range D is larger, but it becomes highly possible that reflected waves reflected by various materials are received in addition to ultrasonic waves that have passed through the recording material P. Therefore, the detection range D is set as a range where an effect of reflected waves is small and the amplitude of the form of a received wave is as large as possible. Accordingly, the detection range D can be arbitrarily set as long as detection of a recording material P can be accurately performed.

Figure 5:
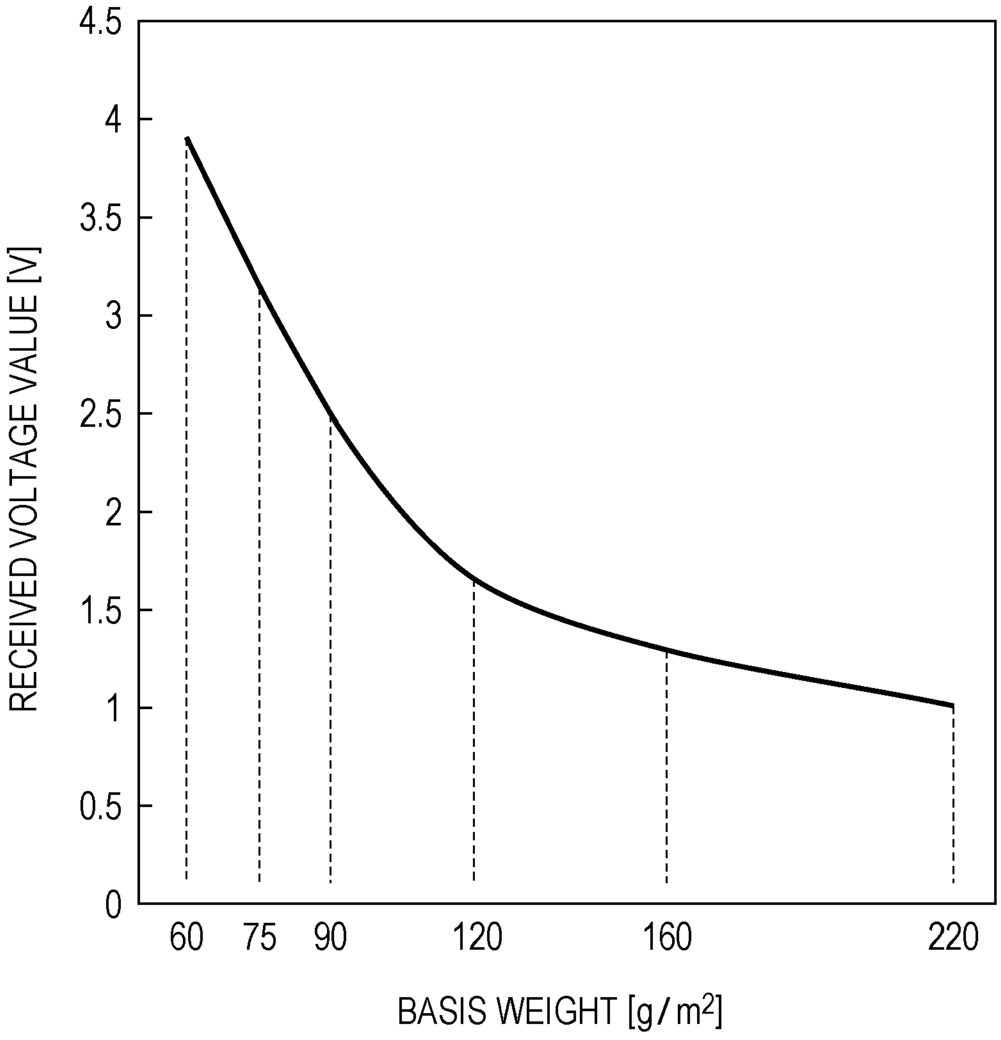
FIG. 5 is a diagram illustrating a relationship between a basis weight of a recording material P and a received voltage value.

FIG. 5 illustrates an example of a relationship between a basis weight of a recording material P and a received voltage value. The graph shows that the received voltage value changes in accordance with the basis weight of the recording material P, as described above. More specifically, the received voltage value is larger as the basis weight of the recording material P is smaller, and the received voltage value is smaller as the basis weight of the recording material P is larger. The basis weight of the recording material P can be detected by using the relationship between the recording material P and the received voltage value. For example, regarding a method for determining a basis weight on the basis of the relationship between the received voltage value and the basis weight in this graph, the relationship between the received voltage value and the basis weight can be derived as follows, for example, the basis weight is 60 g/$m^2$ when the received voltage value is about 3.9 V, and the basis weight is 75 g/$m^2$ when the received voltage value is about 3.2 V. Then, a threshold of the received voltage value is set to 3.5 V in order to determine a basis weight of 60 g/$m^2$ and a basis weight of 75 g/$m^2$, for example, and a basis weight can be specified by determining whether the received voltage value exceeds the threshold. In this way, a basis weight can be determined by appropriately setting a threshold in accordance with a range of basis weights to be determined and comparing a received voltage with the threshold. The relationship between the received voltage value and basis weight described here is an example, and changes in accordance with a change in conditions, such as the frequency of ultrasonic waves, power supply voltage, air pressure, and the like. The threshold that defines the relationship between the received voltage value and basis weight can be appropriately changed in accordance with conditions.

Figure 6:
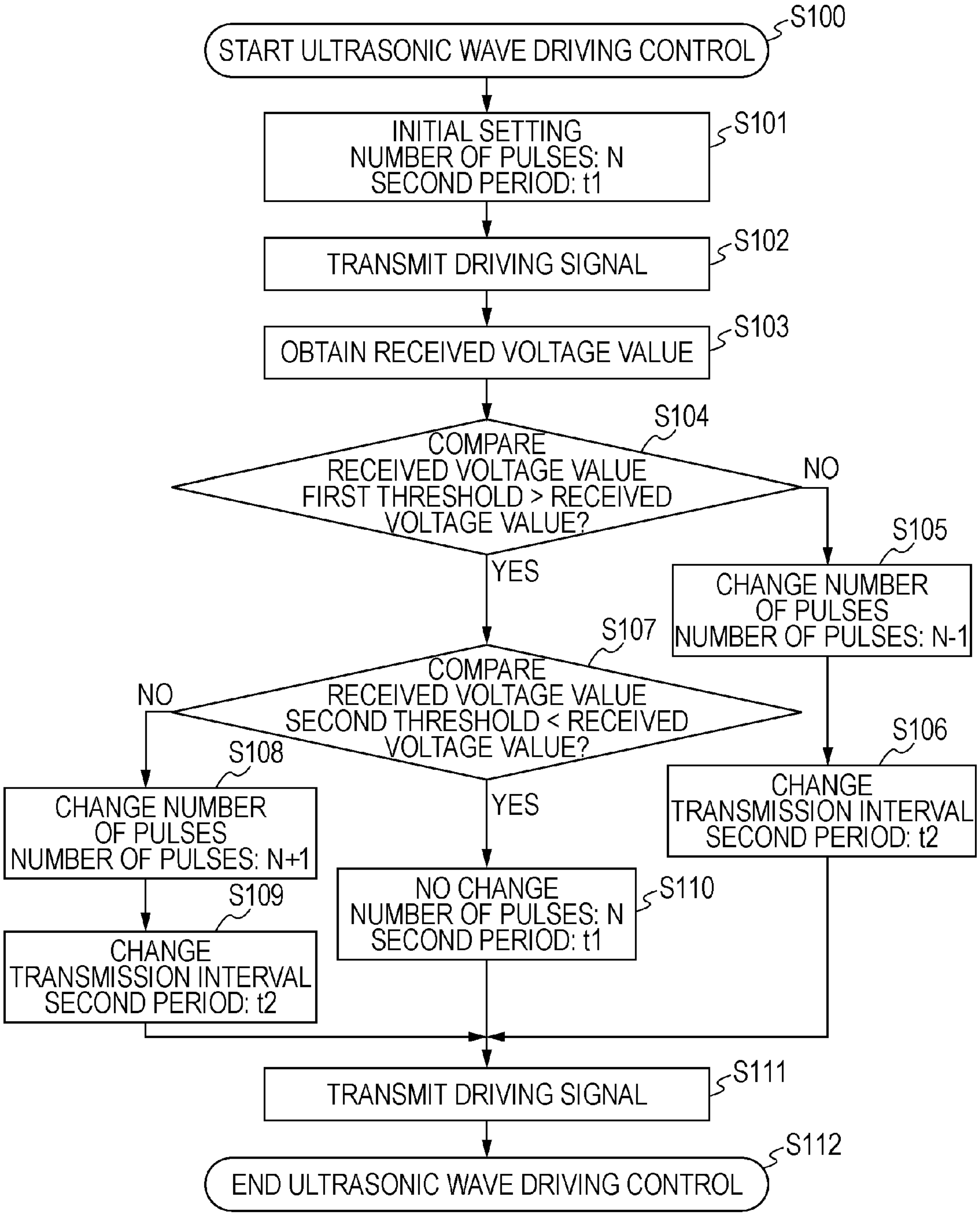
FIG. 6 is a flowchart illustrating operation of the ultrasonic wave control device.

The operation of the ultrasonic wave control device will be described with reference to the flowchart in FIG. 6. First, the control unit 10 determines the conveyance of a recording material P by receiving a signal in the image forming apparatus, and starts driving the ultrasonic wave control device in sequence S100. In sequence S101, an initial setting of a driving signal is performed. In this embodiment, as an example, an initial setting is made so as to detect a recording material P having a basis weight of 75 g/$m^2$ to 120 g/$m^2$ (hereinafter this range of basis weight is defined as ordinary paper). The initial setting is not limited to the foregoing basis weights, and a setting can be appropriately made for thinnest or thickest paper that are used in the image forming apparatus, for example. In sequence S102, a driving signal is caused to be transmitted on the basis of the values of the initial setting determined in sequence S101.

Figure 7:
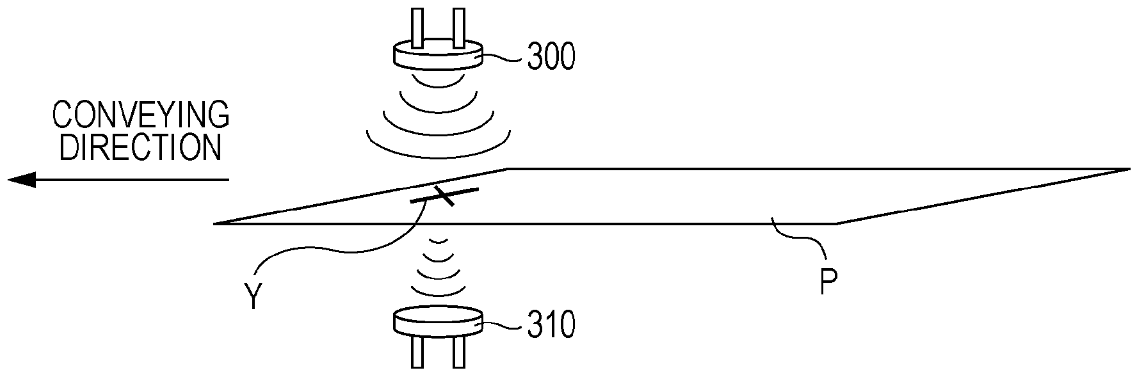
FIG. 7 is a diagram illustrating a point of an initial measurement.

In sequence S103, an ultrasonic wave that has passed through a recording material P is received by the ultrasonic wave receiving element 310 at a measurement point Y illustrated in FIG. 7, for example, as an initial measurement. The reception of an ultrasonic wave is not necessarily started from the measurement point Y, and can be started from any point in the plane of the recording material P. Also, the number of initial measurements is not limited to one, and can be appropriately set. For example, a plurality of measurements may be performed and an average value thereof may be set as a measurement value.

Here, the number of measurements in a certain recording material P will be described. For example, when it is assumed that a processing speed is set to 200 mm/s and a measurement range is set to 50 mm for a recording material P having an A4 size that is longitudinally conveyed, about 125 measurements can be performed in the recording material P when the measurements are performed using ultrasonic waves based on driving signals driven with five pulses. Among them, the first several measurements are set as an initial measurement.

In sequence S104, the received voltage value obtained in sequence S103 is compared with a preset first threshold. The first threshold according to this embodiment is set to a value that enables a determination of 75 g/$m^2$ or less, with a recording material P having a basis weight of 75 g/$m^2$ being a reference (hereinafter this basis weight range is defined as thin paper). That is, in the foregoing example in FIG. 5, the first threshold is 3.2 V. If the received voltage value is over the first threshold, the recording material P can be determined to be thin paper.

In a case where the received voltage value is larger than the first threshold in sequence S104, that is, in a case where the recording material P is determined to be thinner than ordinary paper, the process proceeds to sequence S105. In sequence S105, the initially-set number of pulses in the first period of the driving signal is decreased. For example, in a case where a reference number of pulses is N, the number of pulses is decreased by one, that is, to N−1 pulses. Here, the number of pulses is decreased by one, but the number of pulses can be decreased by one or more within a range where a determination of the recording material P can be performed.

Figure 8A:
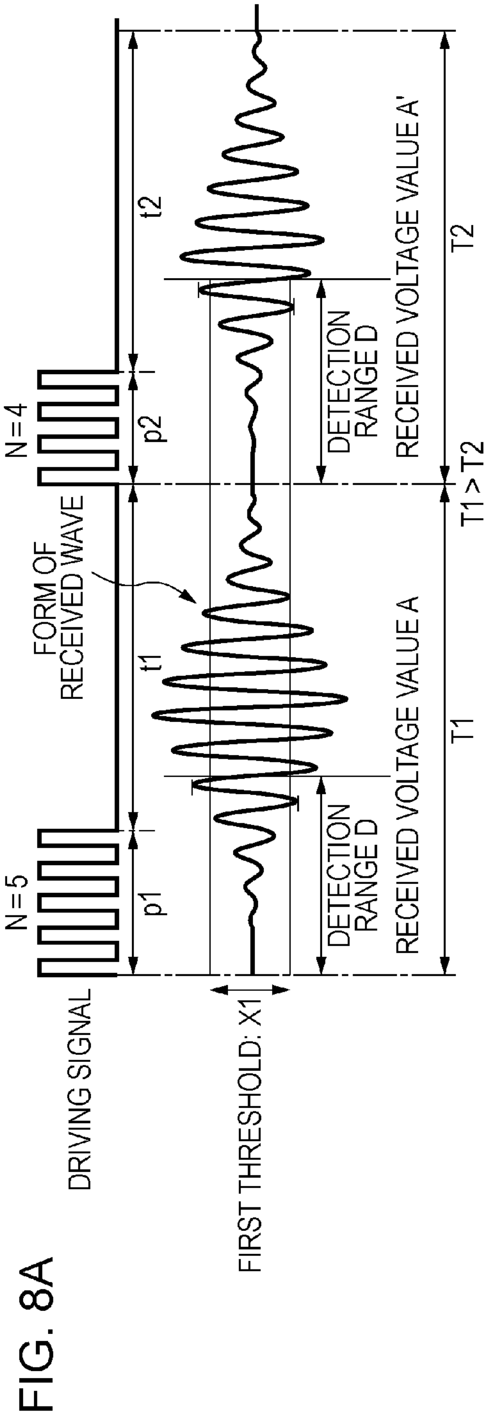
FIGS. 8A and 8B are diagrams illustrating control of the number of pulses of a driving signal according a result of an initial measurement.

In sequence S106, the second period of the driving signal is determined in accordance with the number of pulses that is changed in sequence S105. For example, in a case where the number of pulses is five as illustrated in FIG. 8A, the second period is determined to be t1. In a case where the number of pulses is four, the second period is determined to be t2. The relationship between the second periods t1 and t2 of the driving signal is t1>t2. The decrease in the number of pulses causes t2 as the second period to be shortened, so that the transmission intervals of driving signals can be shortened and that the number of measurements in the recording material P can be increased, whereby the accuracy of determining the basis weight of the recording material P can be increased. Specifically, when measurements are performed using ultrasonic waves based on driving signals in which the number of pulses is four under the same condition as that described above in the foregoing sequence S103, about 135 measurements can be performed. That is, a decrease by one pulse can increase the number of measurements by ten in a measurement range of 50 mm. This increased number is an example, and the number of measurements changes when conditions such as the number of pulses to be decreased and setting of a measurement range change.

In a case where the received voltage value is smaller than the first threshold in sequence S104, that is, in a case where the recording material P is determined to be ordinary paper or thicker than ordinary paper, the process proceeds to sequence S107. In sequence S107, the received voltage value is compared with a preset second threshold. The second threshold according to this embodiment is set to a value that enables a determination of over 120 g/m$^2$, with a recording material P having a basis weight of 120 g/m$^2$ being a reference (hereinafter this basis weight range is defined as thick paper). That is, in the foregoing example in FIG. 5, the second threshold is 1.7 V. If the received voltage value is under the second threshold, the recording material P can be determined to be thick paper.

Figure 8B:
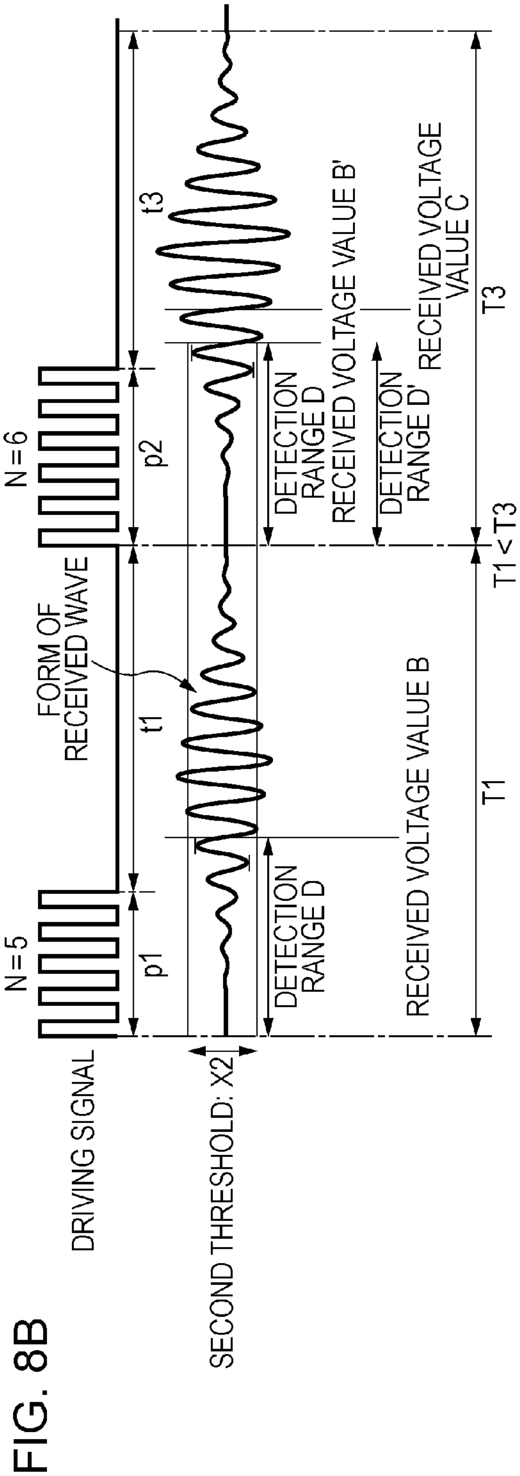

In a case where the received voltage value is smaller than the second threshold in sequence S107, that is, in a case where the recording material P is determined to be thicker than ordinary paper, the process proceeds to sequence S108. In sequence S108, the initially-set number of pulses in the first period of the driving signal is increased. For example, in a case where a reference number of pulses is N, the number of pulses is increased by one, that is, to N+1 pulses. Here, the number of pulses is increased by one, but the number of pulses can be increased by one or more within a range where a determination of the recording material P can be performed. In sequence S109, the second period of the driving signal is determined in accordance with the number of pulses that is changed in sequence S108. For example, in a case where the number of pulses is five as illustrated in FIG. 8B, the second period is determined to be t1. In a case where the number of pulses is six, the second period is determined to be t3. The relationship between t1 and t3 is t1<t3. The increase in the number of pulses causes t3, in which an ultrasonic wave is in the second period, to be elongated. However, the amplitude of the ultrasonic wave increases and thus a received voltage value increases. Although the details will be described below, an increase in received voltage value enables easier detection of the basis weight of a recording material P, so that the detection accuracy of the recording material P can be increased.

In a case where the received voltage value is larger than the second threshold in sequence S107, that is, in a case where the recording material P is determined to have a received voltage value of ordinary paper, the process proceeds to sequence S110. In sequence S110, the setting of the initially-set driving signal is not changed. In sequence S111, the basis weight of the recording material P is detected by using driving signals that are controlled in accordance with a result determined through the initial measurement. By detecting the basis weight of the recording material P in accordance with ultrasonic waves using the driving signals that are controlled in accordance with the result determined through the initial measurement, the detection of the basis weight can be performed by using driving signals suitable for thick paper if the recording material P is determined to be thick paper in the initial measurement, for example. Likewise, in a case of ordinary paper or thin paper, the detection accuracy of the basis weight of a recording material P can be increased by using driving signals suitable therefor.

In the description about this embodiment, a determination is performed on thin paper and thick paper with reference to ordinary paper in the initial measurement, but thin paper or thick paper can be used as a reference of the initial measurement. Furthermore, two thresholds are used in the initial measurement and the recording material P is classified into three types, but the invention is not limited thereto. For example, the thresholds may be further increased/decreased and the classification in the initial measurement may be changed.

A description will be given about control of the number of pulses of a driving signal and the transmission intervals of driving signals according to this embodiment with reference to FIGS. 8A and 8B. FIG. 8A is a waveform in a case where thin paper is detected on the basis of a received voltage value measured in an initial measurement and where the number of pulses is controlled in accordance with the detection result. FIG. 8B is a waveform in a case where thick paper is detected on the basis of a received voltage value measured in an initial measurement and where the number of pulses is controlled in accordance with the detection result. In both of FIGS. 8A and 8B, a waveform of a detection result of an initial measurement is illustrated on the left side, and a waveform obtained after the number of pulses of a driving signal has been controlled in accordance with the detection result of the initial measurement is illustrated on the right side. Here, the number of pulses of a driving signal in an initial measurement is five as an example, but the invention is not limited thereto. The number of pulses in an initial measurement can be set to a predetermined number.

FIG. 8A illustrates a case where the recording material P is determined to be thin paper on the basis of a received voltage value in an initial measurement. A received voltage value A in the initial measurement is compared with a first threshold X1. Since the relationship therebetween is A>X1, the recording material P is determined to be thin paper, and the number of pulses is decreased. Here, when the received voltage value A of five pulses is compared with a received voltage value A' of four pulses, it can be understood that A>A'. This is because of the relationship between the number of pulses of a driving signal and the detection range D. When the case of driving an ultrasonic wave using four pulses is compared with the case of driving an ultrasonic wave using five pulses, it can be understood that a difference in received voltage value for determining thin paper having a small basis weight on the basis of the relationship between basis weight and received voltage value illustrated in FIG. 5 is larger than that of thick paper, although the received voltage A' of four pulses is small. Specifically, a difference in received voltage value for determining basis weights of 60 g/m$^2$ and 75 g/m$^2$ is about 700 mV, a difference in received voltage value for determining basis weights of 160 g/m$^2$ and 220 g/m$^2$ is about 300 mV, and it can be understood that the difference is larger when thin paper is to be determined. Therefore, an ultrasonic wave may be driven with a decreased number of pulses as long as a difference in received voltage value for determining basis weights of 60 g/m$^2$ and 75 g/m$^2$ can be ensured. Here, an example of decreasing pulses by one has been described as an example. However, pulses can be decreased by one or more in a case where thin paper can be determined even when pulses are decreased by one or more on the basis of the relationship between the number of pulses and the detection range D.

The decrease in the number of pulses from five to four causes a received voltage value to be smaller compared with when an ultrasonic wave is driven with five pulses in a range from the four pulses. Thus, the time until an ultrasonic wave received by the ultrasonic wave receiving element 310 converges is shortened. A transmission interval between transmission of a driving signal and transmission of a next driving signal is the time from when an ultrasonic wave is transmitted until the received ultrasonic wave converges. Thus, as the time until the ultrasonic wave converges is shorter, the transmission interval of driving signals can be shorter. That is, the transmission interval of driving signals can be determined by the number of pulses in the first period of a driving signal and the period when pulses are suspended in the second period. The time in the first period of a driving signal is determined by the number of pulses, and thus a next driving signal can be efficiently transmitted by controlling the second period in accordance with the time when an ultrasonic wave converges. Accordingly, it can be understood that the transmission interval in FIG. 8A has a relationship of T1>T2 and that the transmission interval can be shorter in the latter case where the number of pulses is decreased. As a specific example, the time of measurement using five pulses is compared with the time of measurement using four pulses under the same condition as that described above in sequence S103 in FIG. 6. In the case of five pulses, it takes 2 ms to perform one measurement. In the case of four pulses, it takes 1.85 ms to perform one measurement. That is, the decrease by one pulse enables the time of one measurement to be shortened by 0.15 ms. Thus, by controlling the period when pulses are suspended in the second period in accordance with a decrease in the number of pulses, more measurements can be performed on the recording material P. By detecting the basis weight of the recording material P on the basis of many measurement results, the detection accuracy can be increased.

FIG. 8B illustrates a case where the recording material P is determined to be thick paper on the basis of a received voltage value in an initial measurement. A received voltage value B in the initial measurement is compared with a second threshold X2. Since the relationship therebetween is B<X2, the recording material P is determined to be thick paper, and the number of pulses is increased.

The increase in the number of pulses causes the received voltage value in the detection range D to be B<B'. Since the received voltage value can be increased, the detection accuracy of the basis weight of the recording material P can be increased. The increase in the detection accuracy of the recording material P realized by increasing the received voltage value will be described below in detail with reference to the graph in FIG. 9. Also, due to an increase in the number of pulses, the time until an ultrasonic wave converges is longer than that before the number of pulses increases, and thus a relationship of T1<T3 is realized in the transmission interval. Furthermore, a detection range of a received voltage value after the number of pulses has been increased may be changed from the detection range D to the detection range D'. By changing the detection range to the detection range D' of the received voltage value after the number of pulses has been increased, a received voltage value C is obtained in the detection range D' in contrast to the received voltage value B in the detection range D in the initial measurement, so that a relationship of B<C can be realized in the received voltage values. That is, by increasing the number of pulses, and furthermore shifting the detection range of a received voltage value to the rear side to increase the detection range, the received voltage value that can be obtained can be increased. When the detection range of the received voltage value is shifted to the rear side, the received voltage value may be affected by noise, such as reflected waves or the like from surrounding members. When the received voltage value is affected by noise, accurate detection of a basis weight cannot be performed on the basis of the received voltage value, and thus the range is shifted to the rear side such that the received voltage value is not affected by noise. Accordingly, in a case where the recording material P is determined to be thick paper on the basis of the received voltage value in the initial measurement, the number of pulses is increased to increase the received voltage value, so that the detection accuracy of the basis weight of the recording material P can be increased.

Figure 9:
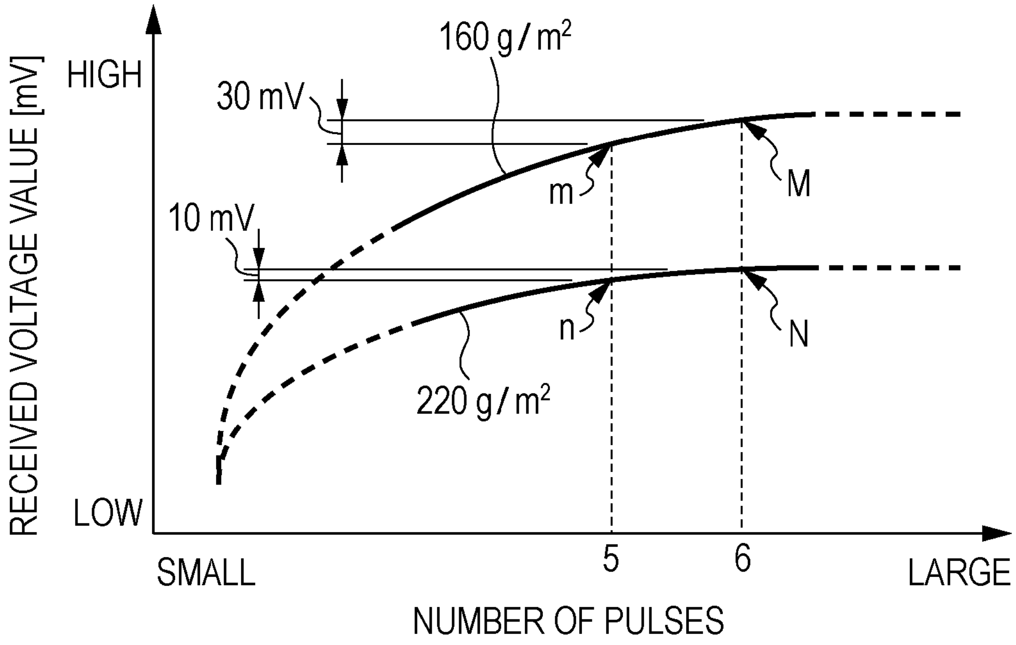
FIG. 9 is a diagram illustrating changes in received voltage values when the basis weights of recording materials P are 160 g/m$^2$ and 220 g/m$^2$, respectively.

As an example, FIG. 9 illustrates received voltage values when recording materials P having basis weights of 160 $g/m^2$ and 220 $g/m^2$, respectively, are measured. Here, a description will be given about a change in received voltage value when the number of pulses is changed from five to six. In the recording material P having a basis weight of 160 $g/m^2$, the received voltage value increases by 30 mV due to an increase in the number of pulses from five to six. In the recording material P having a basis weight of 220 $g/m^2$, the received voltage value increases by 10 mV due to an increase in the number of pulses from five to six. That is, with five pulses, the difference in received voltage value between a basis weight of 160 $g/m^2$ and a basis weight of 220 $g/m^2$ is m-n, whereas, with six pulses, the difference in received voltage value between a basis weight of 160 $g/m^2$ and a basis weight of 220 $g/m^2$ is M-N. That is, the difference in received voltage value between the basis weights increases by 20 mV. Accordingly, the difference in received voltage value becomes large, and thus the basis weight of a recording material P can be uniquely specified on the basis of a received voltage value and the detection accuracy of the basis weight can be increased.

In this embodiment, a description has been given about a method for controlling the number of pulses of a driving signal in accordance with a recording material P. As a method for controlling a driving signal, not only the number of pulses but also the amplitude and frequency may be controlled in accordance with a recording material P. However, a dedicated power supply for causing the amplitude of the driving signal to be variable and a piezoelectric element having a plurality of resonance frequencies for causing the frequency to be variable need to be separately provided. On the other hand, when the number of pulses is caused to be variable, only changing an instruction from the control unit is necessary, and thus control can be easily performed, and a driving signal can be controlled in accordance with a recording material P without using a plurality of power supplies and piezoelectric elements.

In this way, a recording material P is first determined in rough classification on the basis of a received voltage value obtained in an initial measurement, and the number of pulses of a driving signal is controlled in accordance with a result of the initial measurement. Since an ultrasonic wave can be transmitted on the basis of the driving signal that is controlled to the number of pulses appropriate for the recording material P, the number of measurements can be increased in accordance with the recording material P and the received voltage value can be increased. Thus, the basis weight of the recording material P can be accurately detected. In this embodiment, a result of an initial measurement is not used to detect the recording material P, but the result of the initial measurement can be used to detect the basis weight of the recording material P.

(Second Embodiment)

In the first embodiment, a description has been given about a method for controlling a driving signal using a result of an initial measurement. In this embodiment, a description will be given about a method for detecting a multi-feeding state of a recording material P using a result of an initial measurement. Note that a description about the same things as those in the first embodiment, such as the configurations of the image forming apparatus 1 and the ultrasonic wave control device and the definition of a driving signal, is omitted here.

Figure 10:
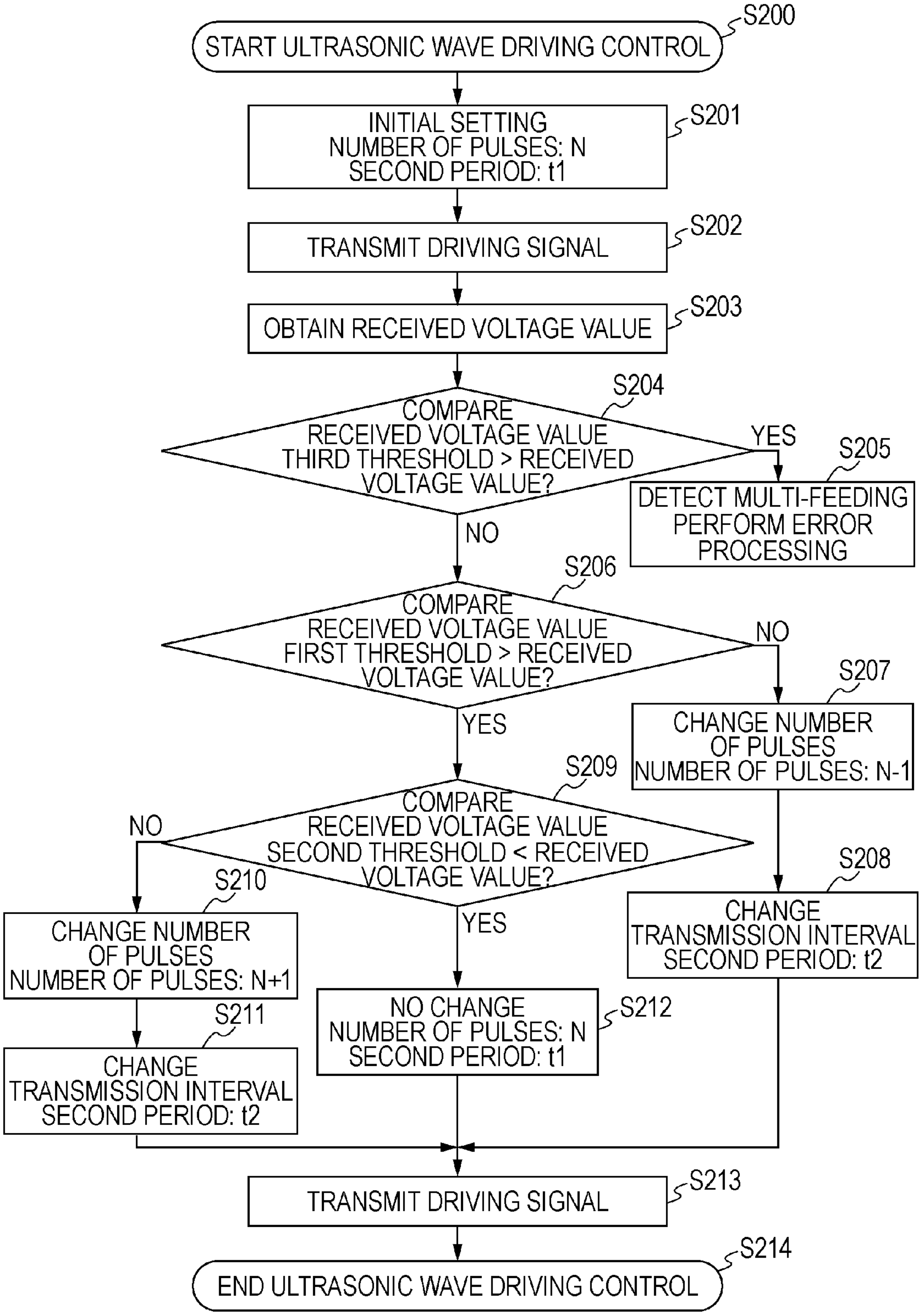
FIG. 10 is a flowchart illustrating a multi-feeding detection operation of the ultrasonic wave control device.

An operation of detecting multi-feeding in this embodiment will be described with reference to the flowchart in FIG. 10. In this flowchart, sequences S200 to S203 and sequences S206 to S214 are similar to sequences S100 to S112 in the flowchart in FIG. 6 of the foregoing first embodiment, and thus the description thereof is omitted here.

Figure 11:
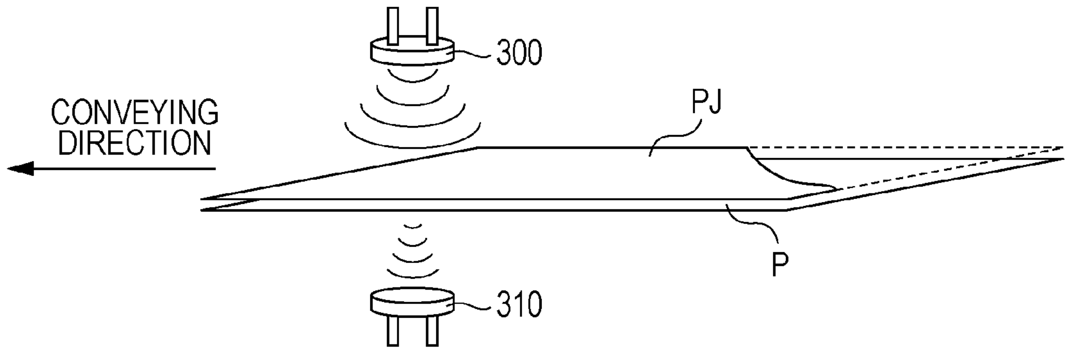
FIG. 11 is a schematic view illustrating a multi-feeding state of a recording material P.

In sequence S204, the control unit 10 compares the received voltage value obtained in sequence S203 with a preset third threshold. In this embodiment, the third threshold is set as a value for determining whether a recording material P is in a multi-feeding state or not. Here, a description will be given about what is the multi-feeding state with reference to the schematic view in FIG. 11. As illustrated in FIG. 11, an air layer exists between a recording material P and a recording material PJ that is fed therewith. This air layer causes the phase of an ultrasonic wave to shift, or an ultrasonic wave passes through two or more recording materials to decrease a received voltage value, so that the received voltage value in the detection range D extremely decreases. Therefore, when the received voltage value is smaller than the preset third threshold, it can be determined that a recording material P that is being conveyed is in a multi-feeding state. A specific threshold will be described below with reference to FIGS. 12A, 12B, and 13.

Therefore, in a case where the received voltage value is smaller than the third threshold, that is, in a case where it is determined that the recording material P is in a multi-feeding state, the process proceeds to sequence S205. In sequence S205, error processing is performed, for example, the image forming apparatus 1 is notified that the recording material P is in a multi-feeding state, or conveyance of the recording material P in a multi-feeding state is stopped. In a case where the received voltage value is larger than the third threshold in sequence S204, that is, in a case where the received voltage value indicates a basis weight in a state where the recording material P is conveyed alone, it is determined that the recording material P that is being conveyed is not in a multi-feeding state, and the process proceeds to sequence S206.

Figures 12A, 12B:
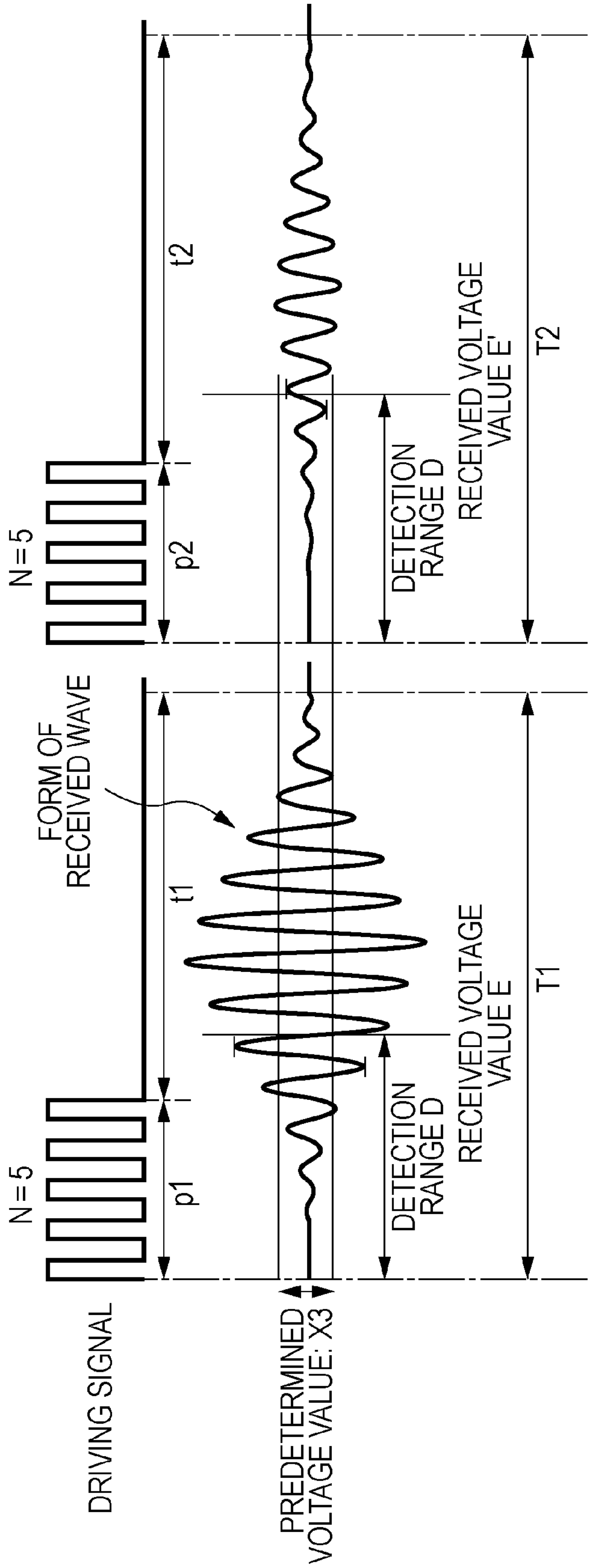
FIGS. 12A and 12B are diagrams illustrating received voltage values when a recording material P is in a multi-feeding state.

Detection of multi-feeding in this embodiment will be described with reference to FIGS. 12A and 12B. FIG. 12A illustrates a measurement result in a state where a recording material P is fed alone, and FIG. 12B illustrates a measurement result when a recording material P is fed with another recording material. Each of these figures illustrates a waveform in which the number of pulses is five. The third threshold X3 is smaller than the first threshold and the second threshold in the foregoing first embodiment. In a case where the received voltage value is smaller than the third threshold, it is determined that a multi-feeding state occurs, as described above with reference to FIG. 11. When a received voltage value E' in FIG. 12B is compared with the third threshold X3, $E'<X$ is satisfied and thus it is determined that the recording material P is in a multi-feeding state.

Figure 13:
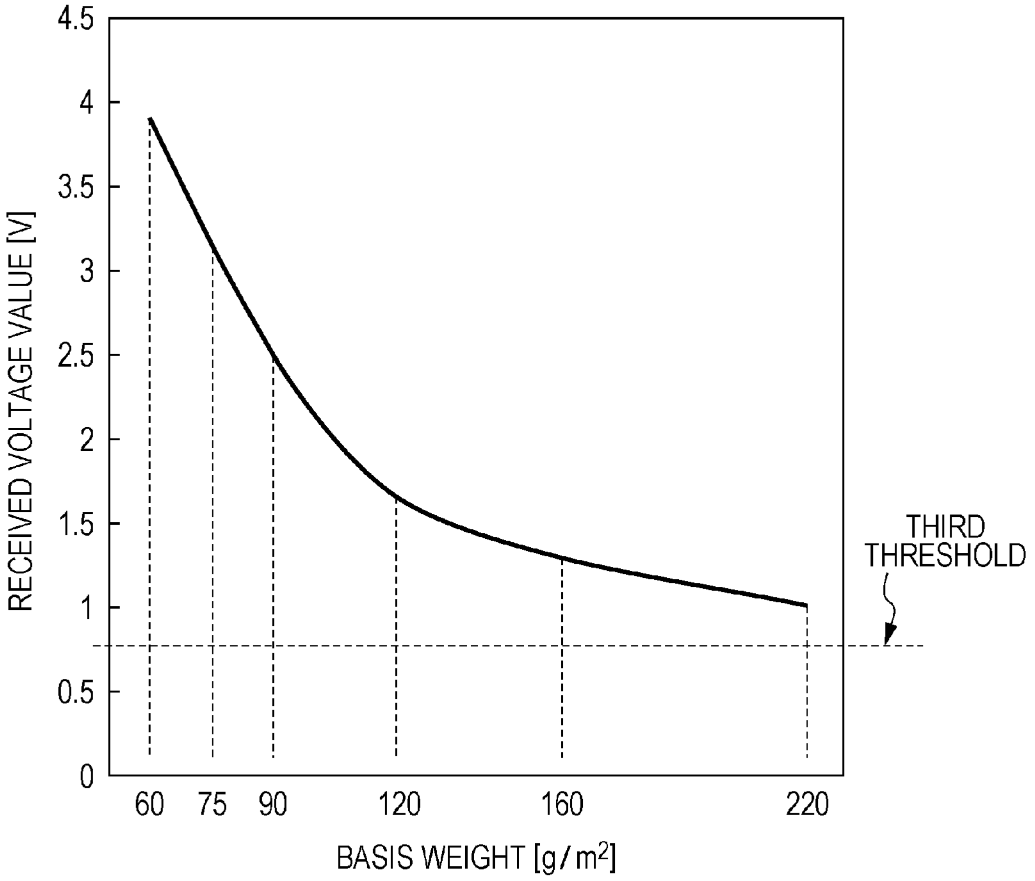
FIG. 13 is a diagram illustrating a threshold for determining that a recording material P is in a multi-feeding state.

FIG. 13 illustrates an example of the third threshold in a graph showing the relationship between a received voltage value and a basis weight. When it is assumed that the largest basis weight to be detected is 220 g/m$^2$, the corresponding received voltage value is about 1.0 V. When a received voltage value is under this value, it is determined that an output value is small as a result of multi-feeding, and thus the third threshold is set to 0.8 V as an example here.

In this way, a multi-feeding state of a recording material P can be detected on the basis of a received voltage value in an initial measurement. Accordingly, detection of multi-feeding can be performed using an ultrasonic wave control device without setting a special unit or the like for detecting multi-feeding, in addition to increasing the determination accuracy of the basis weight of a recording material P.

According to the configuration of the present invention, an ultrasonic wave can be output in accordance with a recording material by appropriately controlling a driving signal in accordance with the recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Reference Signs List

1 image forming apparatus
10 control unit
30 ultrasonic wave transmitting unit
31 ultrasonic wave receiving unit
32 received voltage detecting unit
33 ultrasonic wave driving unit
300 ultrasonic wave transmitting element
301 ultrasonic wave transmitting circuit
310 ultrasonic wave receiving element
311 ultrasonic wave receiving circuit
331 driving signal control unit
332 driving signal transmitting unit
P recording material

The invention claimed is:

1. An ultrasonic wave control device for determining a basis weight of a recording material, comprising:
- an ultrasonic wave transmitting unit configured to transmit an ultrasonic wave;
- an ultrasonic wave receiving unit configured to receive an ultrasonic wave;
- a driving signal transmitting unit configured to transmit a driving signal that has a predetermined number of pulses in order to cause the ultrasonic wave transmitting unit to transmit an ultrasonic wave; and
- a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed,
- wherein the control unit sets a change quantity of the predetermined number of pulses in accordance with an ultrasonic wave received by the ultrasonic wave receiving unit.

2. The ultrasonic wave control device for determining a basis weight of a recording material according to claim 1,
- wherein the driving signal has a first period when the pulses are transmitted and a second period when the pulses are not transmitted, and
- wherein the control unit controls the second period including a period when vibration of an ultrasonic wave converges in accordance with a change in the number of pulses in the first period.

3. The ultrasonic wave control device for determining a basis weight of a recording material according to claim 2,
- wherein the control unit decreases the number of pulses in the first period of the driving signal in a case where an amplitude of an ultrasonic wave received by the ultrasonic wave receiving unit does not attenuate to under a first threshold, and does not change the number of pulses in the first period of the driving signal in a case where an amplitude of an ultrasonic wave received by the ultrasonic wave receiving unit attenuates to under the first threshold.

4. The ultrasonic wave control device for determining a basis weight of a recording material according to claim 3, wherein the control unit does not change the number of pulses in the first period of the driving signal in a case where an amplitude of an ultrasonic wave received by the ultrasonic wave receiving unit does not attenuate to under a second threshold, which is a value smaller than the first threshold, and increases the number of pulses in the first period of the driving signal in a case where an amplitude of an ultrasonic wave received by the ultrasonic wave receiving unit attenuates to under the second threshold.

5. The ultrasonic wave control device for determining a basis weight of a recording material according to claim 2, wherein the control unit shortens the second period of the driving signal when decreasing the number of pulses in the first period of the driving signal.

6. The ultrasonic wave control device for determining a basis weight of a recording material according to claim 5, wherein the control unit increases the number of measurements for determining the recording material after decreasing the number of pulses of the driving signal.

7. The ultrasonic wave control device for determining a basis weight of a recording material according to claim 2, wherein the control unit elongates the second period of the driving signal when increasing the number of pulses in the first period of the driving signal.

8. The ultrasonic wave control device for determining a basis weight of a recording material according to claim 7, wherein the control unit increases a difference in threshold for determining the recording material after increasing the number of pulses of the driving signal.

9. A recording material determining device comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the control unit sets a change quantity of the predetermined number of pulses in accordance with an ultrasonic wave received by the ultrasonic wave receiving unit, and determines a basis weight of the recording material on the basis of a reception result of an ultrasonic wave transmitted by using the driving signal in which the number of pulses has been changed.

10. The recording material determining device according to claim 9, wherein the driving signal has a first period when the pulses are transmitted and a second period when the pulses are not transmitted, and wherein the control unit controls the second period including a period when vibration of an ultrasonic wave converges in accordance with a change in the number of pulses in the first period.

11. The recording material determining device according to claim 10, wherein the control unit decreases the number of pulses in the first period of the driving signal in a case where an amplitude of an ultrasonic wave received by the ultrasonic wave receiving unit does not attenuate to under a first threshold, and does not change the number of pulses in the first period of the driving signal in a case where an amplitude of an ultrasonic wave received by the ultrasonic wave receiving unit attenuates to under the first threshold.

12. The recording material determining device according to claim 11, wherein the control unit does not change the number of pulses in the first period of the driving signal in a case where an amplitude of an ultrasonic wave received by the ultrasonic wave receiving unit does not attenuate to under a second threshold, which is a value smaller than the first threshold, and increases the number of pulses in the first period of the driving signal in a case where an amplitude of an ultrasonic wave received by the ultrasonic wave receiving unit attenuates to under the second threshold.

13. The recording material determining device according to claim 12, wherein the control unit determines that a recording material is in a multi-feeding state in a case where the reception result attenuates to under a third threshold that is smaller than the second threshold and that is used for determining a multi-feeding state.

14. The recording material determining device according to claim 13, wherein the control unit increases a difference in threshold for determining the recording material after increasing the number of pulses of the driving signal.

15. The recording material determining device according to claim 10, wherein the control unit shortens the second period of the driving signal when decreasing the number of pulses in the first period of the driving signal.

16. The recording material determining device according to claim 10, wherein the control unit elongates the second period of the driving signal when increasing the number of pulses in the first period of the driving signal.

17. The recording material determining device according to claim 16, wherein the control unit increases the number of measurements for determining the recording material after decreasing the number of pulses of the driving signal.

18. An image forming apparatus comprising:

an image forming unit configured to perform image formation;

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the control unit sets a change quantity of the predetermined number of pulses in accordance with an ultrasonic wave received by the ultrasonic wave receiving unit, and controls a condition of image formation in the image forming unit on the basis of a reception result of an ultrasonic wave transmitted by using the driving signal in which the number of pulses has been changed.

19. An ultrasonic wave control device for determining a basis weight of a recording material, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit decreases the number of pulses in the first period of the driving signal and shortens the second period of the driving signal in accordance with the ultrasonic wave received by the ultrasonic receiving unit, and increases the number of measurements for determining a basis weight of the recording material after decreasing the number of pulses of the driving signal.

20. A ultrasonic wave control device for determining a basis weight of a recording material, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit increases the number of pulses in the first period of the driving signal and elongates the second period of the driving signal in accordance with the ultrasonic wave received by the ultrasonic receiving unit, and increases a difference of thresholds for determining a basis weight of the recording material after increasing the number of pulses of the driving signal.

21. A ultrasonic wave control device for determining a basis weight of a recording material, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, wherein the control unit causes the ultrasonic unit to transmit an ultrasonic wave to the recording material by using the driving signal having the changed numbered of pulses.

22. A recording material determining device, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit decreases the number of pulses in the first period of the driving signal and shortens the second period of the driving signal in accordance with an ultrasonic wave received by the ultrasonic wave receiving unit, increases the number of measurement for determining a basis weight of the recording material after decreasing the number of pulses of the driving signal, and determines the basis weight of the recording material on the basis of a reception result of an ultrasonic wave transmitted by using the driving signal for the number of pulses corresponding to the ultrasonic wave received by the ultrasonic wave receiving unit.

23. A recording material determining device, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit increases the number of pulses in the first period of the driving signal and elongates the second period of the driving signal in accordance with the ultrasonic wave received by the ultrasonic wave receiving unit, increases a difference of thresholds for determining a basis weight of the recording material after increasing the number of pulses in the first period of the driving signal, and determines the basis weight of the recording material on a basis of a reception result of the ultrasonic wave transmitted by using the driving signal for the number of pulses corresponding to the ultrasonic wave received by the ultrasonic wave receiving unit.

24. A recording material determining device, comprising:

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, wherein the control unit causes the ultrasonic unit to transmit an ultrasonic wave to the recording material by using the driving signal having the changed number of pulses, and determines a basis weight of the recording material based on the ultrasonic wave received by the ultrasonic wave receiving unit after the change of the predetermine number of pulses.

25. An image forming apparatus, comprising:

an image forming unit configured to perform image formation;

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit decreases the number of pulses in the first period of the driving signal and shortens the second period of the driving signal in accordance with an ultrasonic wave received by the ultrasonic wave receiving unit, increases the number of measurement for determining a basis weight of the recording material after decreasing the number of pulses of the driving signal, and controls a condition of image formation in the image forming unit on a basis of a reception result of an ultrasonic wave transmitted by using the driving signal for the number of pulses corresponding to the ultrasonic wave received by the ultrasonic wave receiving unit.

26. An image forming apparatus, comprising:

an image forming unit configured to perform image formation;

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, and cause an ultrasonic wave to be transmitted by using the driving signal in which the number of pulses has been changed, wherein the driving signal has a first period in which pulses are transmitted and a second period in which no pulse is transmitted, and wherein the control unit increases the number of pulses in the first period of the driving signal and elongates the second period of the driving signal in accordance with the ultrasonic wave received by the ultrasonic wave receiving unit, increases a difference of thresholds for determining a basis weight of the recording material after increasing the number of pulses in the first period of the driving signal, and controls a condition of image formation in the image forming unit on a basis of a reception result of an ultrasonic wave transmitted by using the driving signal for the number of pulses corresponding to the ultrasonic wave received by the ultrasonic wave receiving unit.

27. An image forming apparatus, comprising:

an image forming unit configured to perform image formation;

an ultrasonic wave transmitting unit configured to transmit an ultrasonic wave;

an ultrasonic wave receiving unit configured to receive an ultrasonic wave;

a driving signal transmitting unit configured to transmit a driving signal that has a predetermined number of pulses in order to cause the ultrasonic wave transmitting unit to transmit an ultrasonic wave; and a control unit configured to perform control to cause the ultrasonic wave transmitting unit to transmit an ultrasonic wave by using a driving signal that has a predetermined number of pulses, change the predetermined number of pulses in accordance with an ultrasonic wave via a recording material and that is received by the ultrasonic wave receiving unit, wherein the control unit causes the ultrasonic unit to transmit an ultrasonic wave to the recording material by using the driving signal having the changed numbered of pulses, and controls a condition of image formation in the image forming unit on a basis of an ultrasonic wave received by the ultrasonic wave after the change of the predetermined number of pulses.

* * * * *